United States Patent

Haws

[11] Patent Number: 6,149,180
[45] Date of Patent: Nov. 21, 2000

[54] LONGITUDINALLY ADJUSTABLE LIFT ARM FOR A THREE-POINT HITCH

[76] Inventor: James E. Haws, 1810 36 Rd., Minden, Nebr. 68959

[21] Appl. No.: 09/221,796

[22] Filed: Dec. 28, 1998

[51] Int. Cl.[7] .................................................. B60D 1/46
[52] U.S. Cl. ................................. 280/479.1; 280/491.2; 172/272; 172/439
[58] Field of Search .................................... 172/272, 439; 280/477, 478.1, 479.1, 482, 491.1, 491.2

[56] References Cited

U.S. PATENT DOCUMENTS

| | | | |
|---|---|---|---|
| D. 337,292 | 7/1993 | Carda | D12/162 |
| 3,053,552 | 9/1962 | Horney | 280/461 |
| 3,056,458 | 10/1962 | Gray | 172/448 |
| 3,432,184 | 3/1969 | Tweedy | 280/479 |
| 3,572,763 | 3/1971 | Cannon et al. | 280/479 |
| 3,850,450 | 11/1974 | Hadskey | 280/479 R |
| 4,153,269 | 5/1979 | von Allwörden | 280/482 |
| 4,194,757 | 3/1980 | Lucas et al. | 280/461 A |
| 4,389,058 | 6/1983 | Cadwell | 172/248 |
| 4,475,741 | 10/1984 | Conrad | 280/482 |
| 4,583,421 | 4/1986 | Rose | 74/586 |
| 4,611,821 | 9/1986 | Jeanson et al. | 280/482 |
| 4,681,336 | 7/1987 | Kryscyk | 280/482 |
| 5,361,850 | 11/1994 | Müller et al. | 172/450 |
| 5,462,302 | 10/1995 | Leitner | 280/277 |
| 5,515,928 | 5/1996 | Niday | 172/6 |
| 5,664,632 | 9/1997 | Frasier | 172/6 |
| 5,687,860 | 11/1997 | Behrens et al. | 213/7 |
| 5,692,573 | 12/1997 | Zahn et al. | 172/439 |
| 5,697,454 | 12/1997 | Wilcox et al. | 172/447 |
| 5,772,230 | 6/1998 | Kemnitz | 280/491.3 |

*Primary Examiner*—Brian L. Johnson
*Assistant Examiner*—Avraham H. Lerner
*Attorney, Agent, or Firm*—Zarley, McKee, Thomte Voorhees & Sease; Dennis L. Thomte

[57] ABSTRACT

An adjustable length lower lift arm is provided for a tractor three-point hitch to enable the tractor to be conveniently and quickly attached to an implement. The adjustable length lower lift arm includes a rearwardly extending connector bar which is movable by means of a hydraulic cylinder positioned in the housing of the lower lift arm. The rearwardly extending bar is moved by means of the hydraulic cylinder to enable the connector at the rearward end of the bar to be aligned with the connector on the implement.

5 Claims, 4 Drawing Sheets

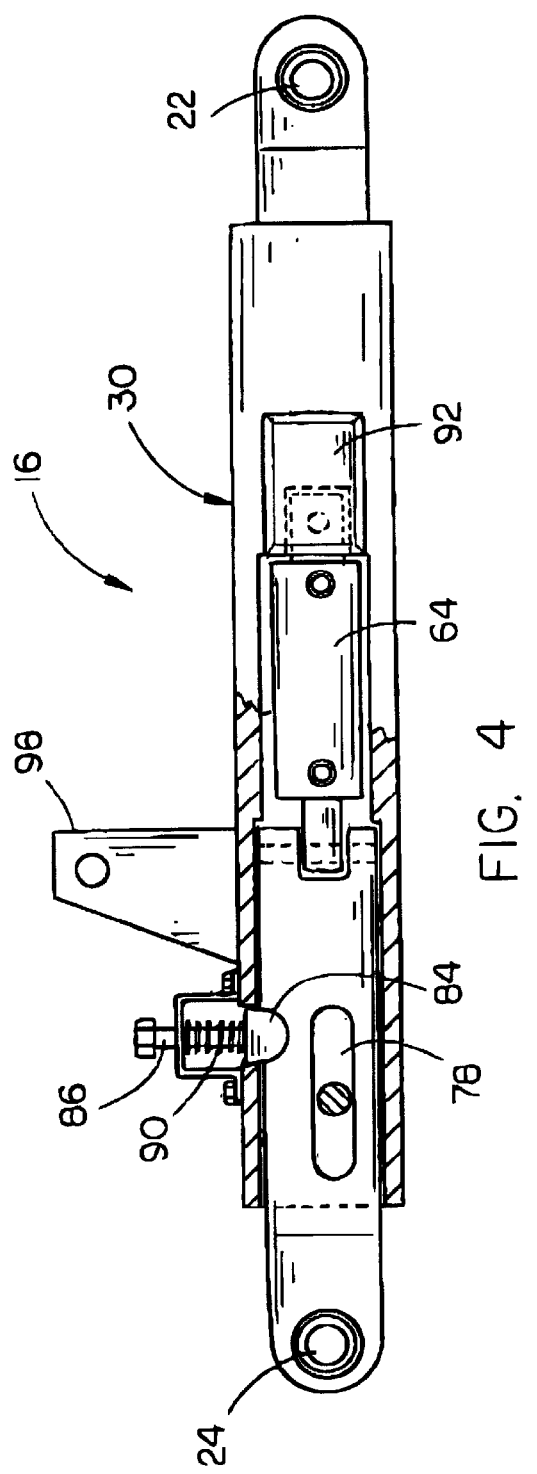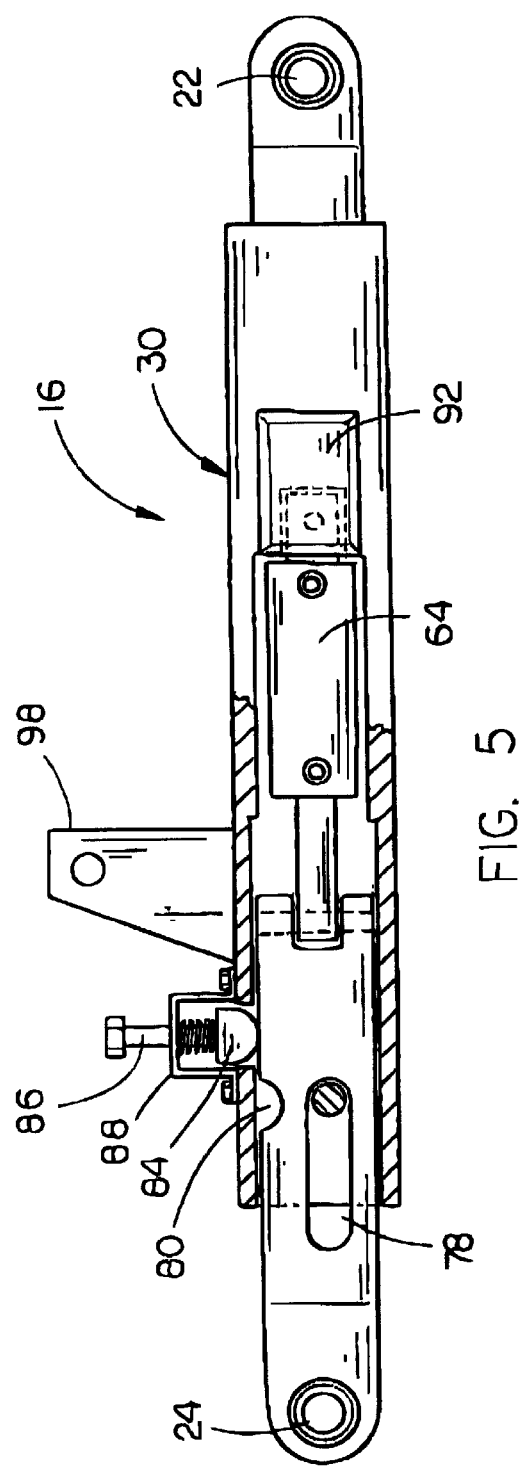

LONGITUDINALLY ADJUSTABLE LIFT ARM FOR A THREE-POINT HITCH

BACKGROUND OF THE INVENTION

1. Field of the Invention

This invention relates to a three-point hitch and more particularly to a longitudinally adjustable lift arm for a three-point hitch which enables a three-point farm implement, such as a cultivator, planter, plow, etc., to be conveniently hitched to a tractor. More particularly, the longitudinally adjustable lift arm of this invention enables the attachment of three-point equipment to the tractor when the tractor is not backed up in perfect alignment with the implement.

2. Description of the Related Art

Many types of three-point hitch assemblies have been previously provided which normally include a pair of lower lift arms and an upper link arm pivotally connected at their forward ends to the tractor. The lower lift arms are pivotally moved upwardly and downwardly by a hydraulic cylinder or the like. When the tractor is being hitched to a three-point implement, it is sometimes difficult to attach the three-point hitch of the tractor to the three-point connectors on the implement if the tractor is not perfectly aligned or squared with respect to the implement. For example, the rearward end of one of the lift arms may be in perfect alignment with one of the connection points of the implement, but the rearward end of the other lift arm may be positioned some distance from the proper connector on the implement. Thus, the tractor operator must continually move the tractor until the three-point hitch assembly of the tractor is in perfect alignment with the three-point connectors on the implement.

SUMMARY OF THE INVENTION

A longitudinally adjustable lift arm for a three-point hitch of a tractor is described with the three-point hitch assembly of the tractor including first and second rearwardly extending lift arms and an upper link arm which are pivotally secured to the tractor at their forward ends and which have means at their rearward ends for connection to an implement. One of the lower lift arms has an adjustable length to enable the implement to be conveniently attached to the three-point hitch assembly of the tractor. The adjustable length lift arm includes an elongated housing having rearward and forward ends, opposite sides, a top portion and a bottom portion. The rearward end of the housing has means at its forward end for pivotal connection to the tractor. The housing of the adjustable length lift arm has an internal compartment formed therein. An elongated hydraulic cylinder is positioned in the internal compartment of the housing and has a cylinder shaft extending rearwardly therefrom. The housing has an opening at its rearward end which communicates with the internal compartment so that a rearwardly extending arm may be mounted in the opening which has its forward end secured to the cylinder shaft and which has its rearward end adapted to be connected to one of the connection points of an implement. The adjustable length lift arm is movable between a rearward extended position and a forward retracted position by means of the hydraulic cylinder located in the housing. A mechanical locking means, movable between locked and unlocked positions, is provided on the housing for engagement with the adjustable arm, when the arm is in its retracted position so that longitudinal forces applied to the arm will be transferred to the housing rather than to the hydraulic cylinder. The locking means, when in its unlocked position, permits the hydraulic cylinder to move the arm rearwardly from the housing to enable the rearward end of the arm to be aligned with a connector on the implement.

It is therefore a principal object of the invention to provide a longitudinally adjustable length lift arm for a three-point hitch assembly on a tractor.

Still another object of the invention is to provide a longitudinally adjustable lower lift arm for a three-point hitch which enables the convenient attachment of the hitch to an implement.

Still another object of the invention is to provide a longitudinally adjustable lower lift arm including means for preventing undue loads from being applied to the hydraulic cylinder which is used to longitudinally adjust the lift arm.

Still another object of the invention is to provide a longitudinally adjustable lift arm for a three-point hitch which is durable in use.

These and other objects will be obvious to those skilled in the art.

BRIEF DESCRIPTION OF THE DRAWINGS

FIG. 4 is a partial vertical, longitudinal sectional view of the invention; and

FIG. 5 is a view similar to FIG. 4 except that the arm has been rearwardly extended.

DESCRIPTION OF THE PREFERRED EMBODIMENT

Figure 1:
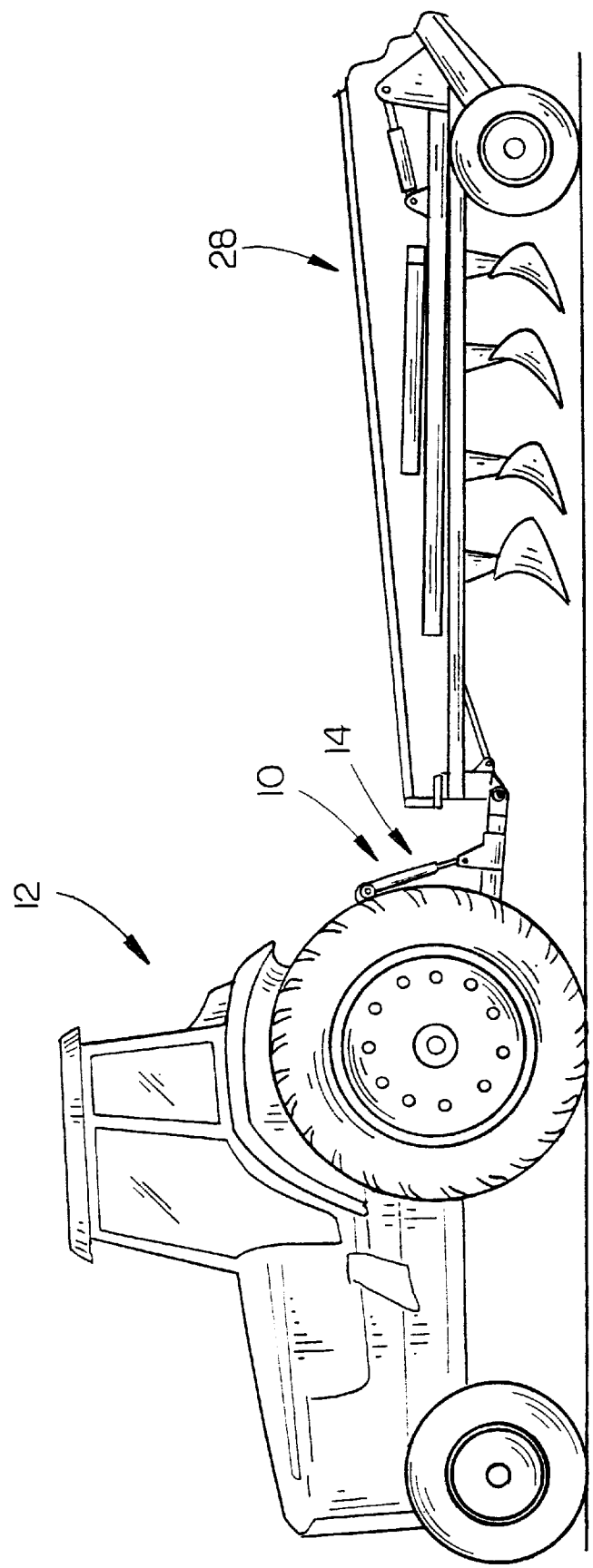
FIG. 1 is a side view of a tractor and implement with the adjustable arm of this invention mounted on the tractor.
Figure 2:
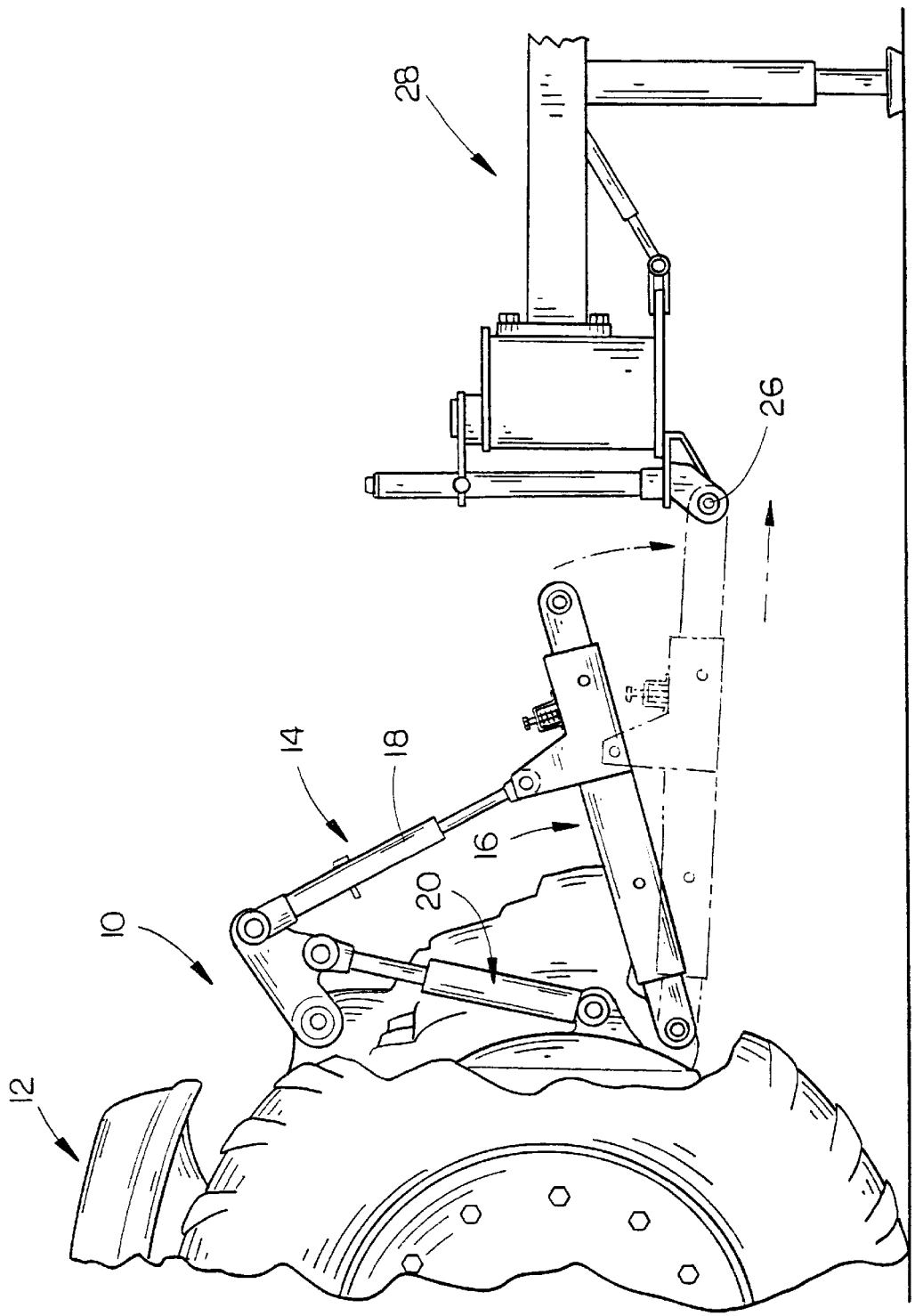
FIG. 2 is a side view illustrating the use of the adjustable lift arm of this invention.

The numeral 10 refers to the rearward end of a conventional tractor 12 having a multi-point hitch assembly 14, such as a three-point hitch assembly, mounted thereon and including a pair of lower lift arms 16 and 16', an upper link arm 18, and a hydraulic cylinder means 20 for raising and lowering the arms 16, 16' and 18 in conventional fashion.

Either or both of the lower lift arms 16 may be adjustable in length, as will be described in greater detail hereinafter. One of the lift arms 16 will be described in detail, with "'" indicating identical structures on arm 16'. Lift arm 16 has its forward end pivoted to the tractor 12 by means of ball and socket connector 22 to enable arm 16 to be raised and lowered. Lift arm 16 includes a ball and socket type connector 24 at its rearward end for connection to a connector pin 26 on the implement 28.

Lift arm 16 comprises an elongated housing member 30 having a curved bar 32 welded to the forward end thereof which has the ball and socket connector 22 mounted thereon to provide the pivotal connection between the forward end of the lift arm 16 and the tractor.

Housing member 30 includes a forward end 36, rearward end 38, opposite sides 40 and 42, an upper end 44, and a lower end 46. The rearward end 38 of housing member 30 has a rectangular opening 48 formed therein which communicates with a rectangular cavity, compartment or opening 50 positioned between sides 40 and 42. Side 42 has an opening 52 formed therein which communicates with a cavity or compartment 56 formed in the interior of housing member 30. The opening 52 is selectively closed by means of an arcuate or curved cover 58 which is bolted to the side 42 of the housing member 30.

Hydraulic cylinder 64 is positioned within cavity 56 with the forward end of the cylinder 64 being positioned adjacent the forward end of the cavity 56. The forward end of the cylinder 64 has an opening 65 formed therein which registers with opening 66 formed in housing 30. Hydraulic cylinder 64 has a pair of fluid ports 68 and 70 formed therein. As seen, cover 58 has a pair of openings formed therein to permit hydraulic lines to be extended therethrough for connection to the ports 68 and 70. Hydraulic cylinder 64 includes a cylinder shaft 72 extending therefrom which is connected to the forward end of bar or arm 74 by pin 76. Bar 74 is movably positioned in opening 50 and extends rearwardly outwardly through opening 48. Bar 74 includes a longitudinally extending slot 78 formed therein as well as a locking notch 80 formed in the upper end thereof.

Figure 3:
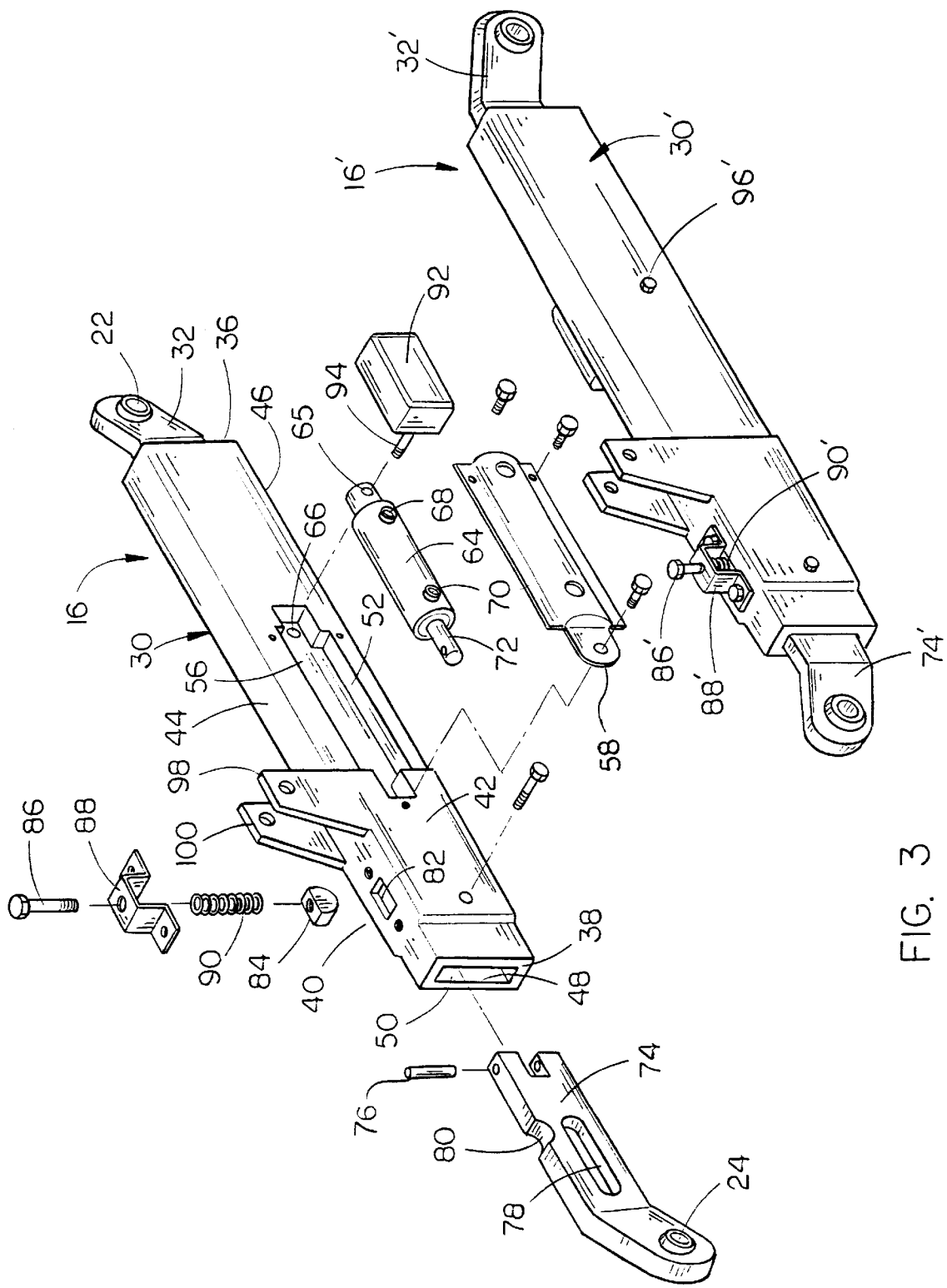
FIG. 3 is a perspective view illustrating a pair of the adjustable lift arms of this invention.

The upper rearward end of housing 30 has an opening 82 formed therein which movably receives locking leg 84 therein, as seen in FIG. 3. Bolt 86 extends downwardly through bracket 88, which is bolted to housing 30, through spring 90 and is threadably received by lug 84. Spring 90 urges bolt 86 and locking lug 84 downwardly with respect to housing 30 into locking notch 80. The numeral 92 refers to a sway bar bumper pad having a bolt 94 extending inwardly therefrom which extends through opening 65, through opening 66, and is secured therein by a suitable nut such as illustrated at 96' in FIG. 3. The housing 30 has a pair of ears 98 and 100 extending upwardly therefrom for connection to one of the upper link arms.

Assuming that only a single length adjustable lower lift arm is utilized, the operation of the equipment will now be described. The tractor 12 is backed up to the implement 28 until the rearward end of lower lift arm 16' is adjacent one of the connector points on the implement. The rearward end of the lower lift arm 16' is raised and lowered by the hydraulic cylinder means 20 until the ball and socket at the rearward end of the lower lift arm 16' is in alignment with the appropriate connector, at which time a pin or the like is extended therethrough. It is quite likely at this time that the rearward end of the lower lift arm 16 will not be aligned with the appropriate connector on the implement 28. Assuming that the rearward end of the bar 74 of the arm 16 is positioned forwardly of the appropriate connector, the operator lifts the bolt 86 which causes the locking lug 84 to be moved out of engagement with the notch 80. The hydraulic cylinder 64 is then extended so that shaft 72 moves the bar 74 rearwardly until the connector 24 is in alignment with the appropriate connector on the implement 28. The rearward end of the lift arm 16 may be raised and lowered by the hydraulic cylinder means 20 during this operation. When the ball and socket connector 24 is in alignment with the appropriate connector, the pin 26 is extended therethrough. The operator may then retract shaft 72 into cylinder 64 so that the bar 74 is pulled forwardly into the housing 30 until the lug 84 matches or registers with the notch 80. Normally, the tractor will be moved rearwardly with respect to the implement 28 to cause the bar 74 to move forwardly into the housing 30. The engagement of the locking lug 84 with the notch 80 prevents undue strain being subjected to the hydraulic cylinder 64 during the normal operation of the tractor and implement.

Thus it can be seen that a novel adjustable length lower lift arm has been provided which enables the tractor operator to hydraulically adjust the length of the lower lift arm 16 to facilitate quick and easy connection of the tractor to the implement.

It can therefore be seen that the invention accomplishes at least all of its stated objectives.

I claim:

1. In combination with a tractor having a three-point hitch assembly at the rearward end thereof for connection to an implement, the assembly including first and second rearwardly extending lower lift arms pivotally secured to the tractor at their forward ends and which are pivotally moved with respect to the tractor by a lift means, comprising:

at least said first lower lift arm having an adjustable length;

said first lower lift arm including an elongated housing having rearward and forward ends, opposite sides, a top portion, and a bottom portion;

said forward end of said housing having means for pivotal connection to the tractor;

said elongated housing having an internal cavity formed therein;

means on said housing for connection to the lift means of the three-point hitch assembly of the tractor;

an elongated hydraulic cylinder positioned in said cavity in said housing;

said hydraulic cylinder including a cylinder body having a movable cylinder shaft extending rearwardly therefrom;

said housing having an opening at its rearward end which communicates with said cavity;

a rearwardly extending arm member, having rearward and forward ends, movably mounted in said opening at said rearward end of said housing;

said forward end of said arm member being operatively secured to said cylinder shaft;

means on the rearward end of said arm member for connection to the implement;

said arm member being selectively movable between a rearward extended position and a forward retracted position by said hydraulic cylinder;

and a mechanical locking means, movable between locked and unlocked positions, on said housing for engagement with said arm member, when said arm member is in its retracted position, to lock said arm member to said housing, when said locking means is in its locked position, whereby longitudinal forces applied to said arm member will be transferred to said housing rather than to said hydraulic cylinder;

said locking means, when in its said unlocked position, permitting said hydraulic cylinder to move said arm member rearwardly from said housing to enable the rearward end of said arm member to be aligned with a connector on the implement and connected thereto;

said locking means being automatically movable to its said locked position after said arm member has been connected to the connector on the implement, as said arm member is moved forwardly with respect to said housing either by said hydraulic cylinder or by the tractor being moved rearwardly with respect to the implement.

2. The combination of claim 1 wherein said arm member has a notch formed therein and wherein said locking means includes a plunger which is received by said notch when said locking means is in its said locked position.

3. The combination of claim 2 wherein said plunger is spring-loaded.

4. The combination of claim 1 wherein a removable plate means closes said cavity.

5. The combination of claim 4 wherein said plate means has openings formed therein to permit the connecting of hydraulic lines to said hydraulic cylinder.

* * * * *